O. W. DUNLAP.
DUSTER.
APPLICATION FILED JUNE 1, 1915.
1,195,190.  Patented Aug. 22, 1916.
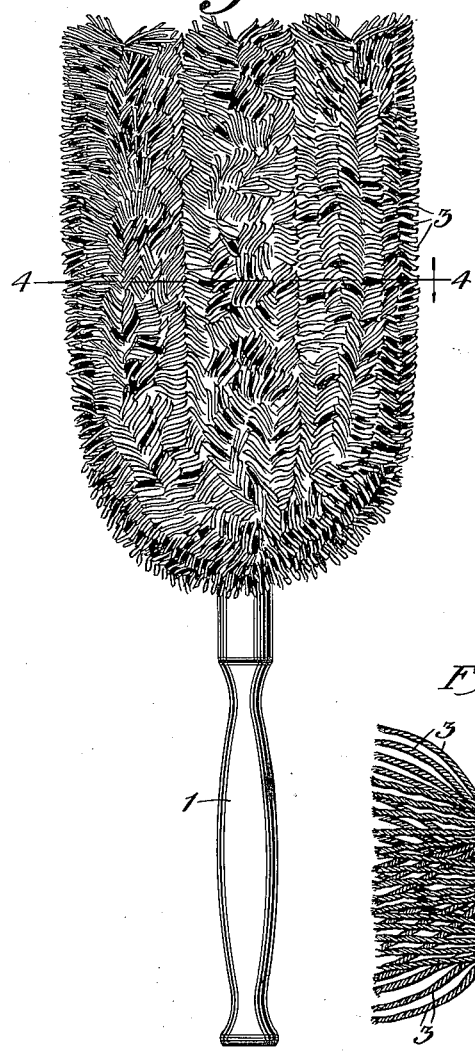
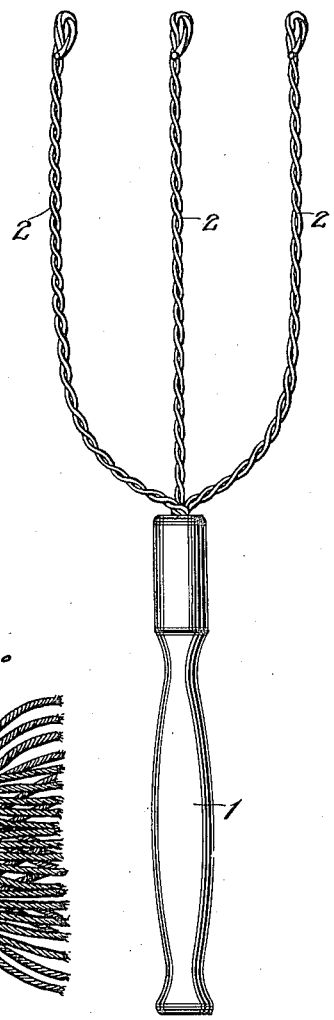
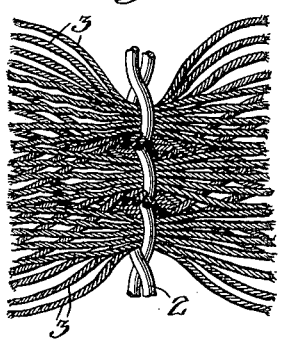
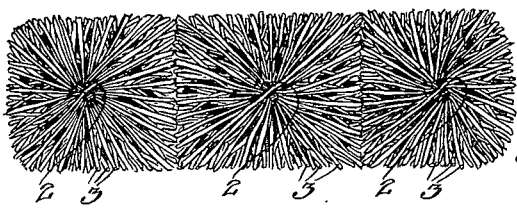
Witnesses
Inventor
Oliver W. Dunlap
By H. B. Willson & Co.
Attorneys

UNITED STATES PATENT OFFICE.

OLIVER W. DUNLAP, OF BLOOMINGTON, ILLINOIS.

DUSTER.

1,195,190.            Specification of Letters Patent.     Patented Aug. 22, 1916.

Application filed June 1, 1915. Serial No. 31,545.

*To all whom it may concern:*

Be it known that I, OLIVER W. DUNLAP, a citizen of the United States, residing at Bloomington, in the county of McLean and State of Illinois, have invented certain new and useful Improvements in Dusters; and I do declare the following to be a full, clear, and exact description of the invention, such as will enable others skilled in the art to which it appertains to make and use the same.

This invention relates to new and useful improvements in dusters and more particularly to dusters having a plurality of prongs or fingers covered with dusting material, and the primary object of the invention is to provide an improved device of this character whereby said pronged fingers are adapted to straddle an article to be dusted and at the same time the dusting material, is thus caused to completely surround said article, thereby rendering easily accessible to reach for dusting purposes all portions of the article. This device is especially adaptable for use on spokes, chair legs or rounds, grille work, and devices of like character.

A further object of the invention is to provide a device which is simple and durable in construction, inexpensive to manufacture, and one which will be very efficient in operation.

With these and numerous other objects in view, the invention consists of the novel features of construction, combination and arrangement of parts which will be herein referred to and more particularly pointed out in the specification and claim.

In the accompanying drawing: Figure 1 is a side elevation of my improved duster; Fig. 2 is a plan view of the duster showing the fingers with the dusting material left off; Fig. 3 is an enlarged detail view of one of the fingers showing the manner of attaching the dusting material thereto; Fig. 4 is a horizontal section taken on the line 4—4 of Fig. 1.

In describing my invention I shall refer to the drawing in which similar reference characters designate corresponding parts throughout the several views and in which the numeral 1 designates an upright handle of any preferred form having projecting from one end a plurality of woven wire fingers 2 spaced from each other for a purpose to be hereinafter more fully described. The fingers 2 have extending transversely therethrough and secured thereby, strips of dusting material 3, which may be of either yarn, wool, or any other preferred substance of this character. The transversely extending strips 3 of dusting material secured in the fingers 2 are of sufficient length to cause their ends to overlap with the ends of the dusting material secured in the adjacent fingers. This arrangement of fingers and dusting material thereby provides the duster with a continuous dusting surface throughout its entire length and width.

The fingers 2 of the duster are all disposed in the same plane, whereby in view of the above stated fact, the duster is adapted to be used as in ordinary devices of this character having a flat dusting surface.

This device is especially adaptable for use on spokes of automobiles or buggy wheels, rounds of chairs, and other articles of like character. Owing to the fact that because of the peculiar structure of the fingers 2 being spaced apart from each other and the transversely extending dusting material held in said fingers overlapping with the dusting material in the fingers adjacent thereto, the device may easily straddle the article to be dusted and the dusting material will entirely surround the same to accomplish the desired purpose.

It is to be observed that the free outer ends of the fingers 2 are bent upon themselves. This provides rounded terminals which cannot scar furniture and the like being dusted, and at the same time increases the density of the strands 3 at the ends of the aforesaid fingers, it being understood that said strands are held in the rearwardly bent ends of said fingers as well as in the remaining lengths of said fingers.

From the foregoing description of the construction of my improved duster and the manner of applying the same to use, the operation of the same will be readily understood, and it will be seen that I have provided a simple, inexpensive, and efficient means for carrying out the objects of the invention.

While I have particularly described the elements best adapted to perform the various functions set forth, it is obvious that various changes in form, proportion, and in the minor details of construction may be resorted to within the scope of the appended claim without departing from the spirit or sacrificing any of the principles of the invention.

I claim:

A duster comprising a plurality of spaced parallel fingers composed of twisted wire and meeting at their inner ends at a central point, a handle secured to said inner ends, and transversely disposed strands of dusting material radiating from said fingers and covering the latter throughout their lengths, said strands being secured between the twisted wire of said fingers, the latter having free disconnected outer ends bent upon themselves, thus providing rounded terminals for said fingers to prevent marring of articles being dusted, and at the same time increasing the density of the strands at the outer ends of said fingers.

In testimony whereof I have hereunto set my hand in presence of two subscribing witnesses.

OLIVER W. DUNLAP.

Witnesses:
A. R. WILCOX,
J. S. THOMPSON.